UNITED STATES PATENT OFFICE.

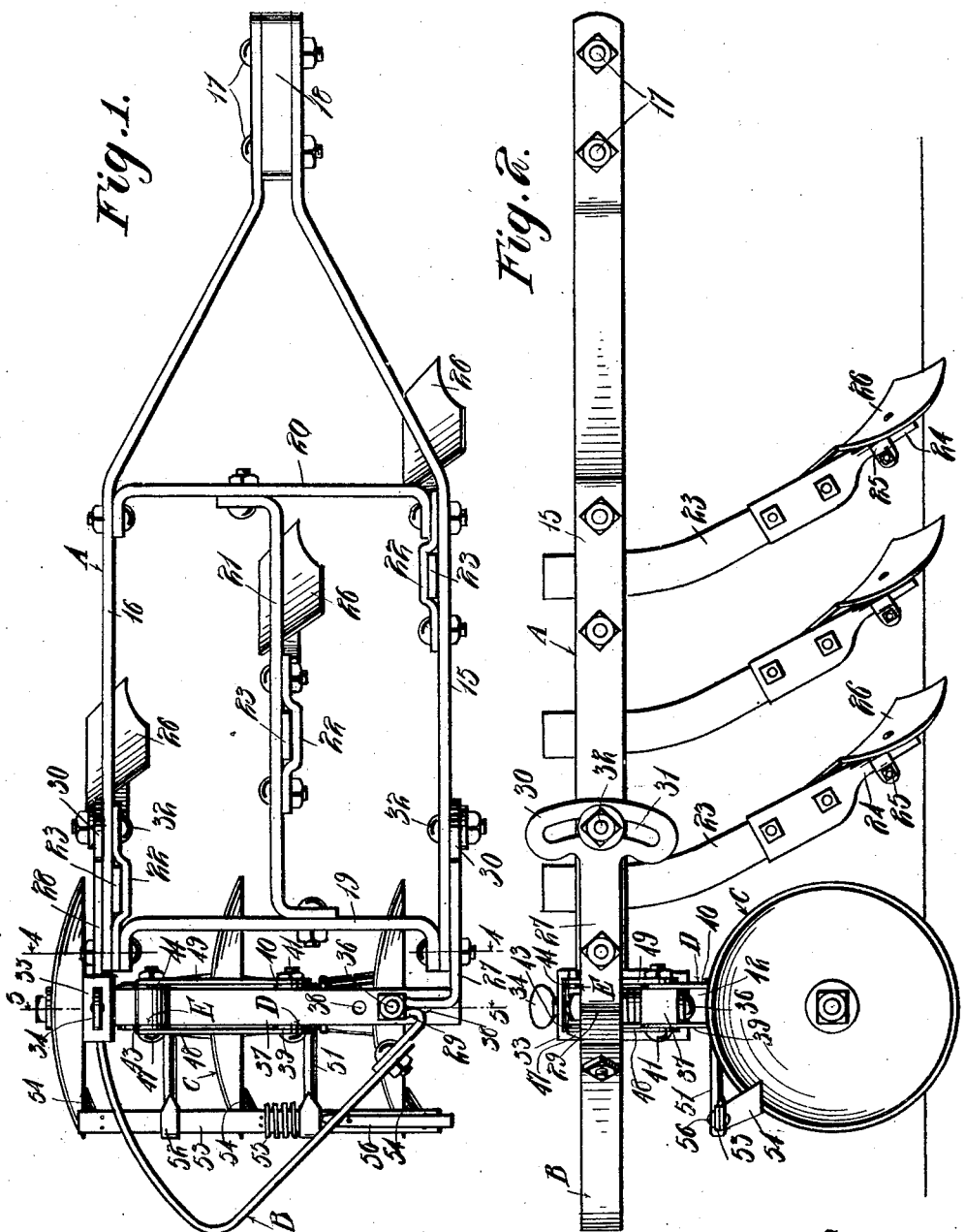

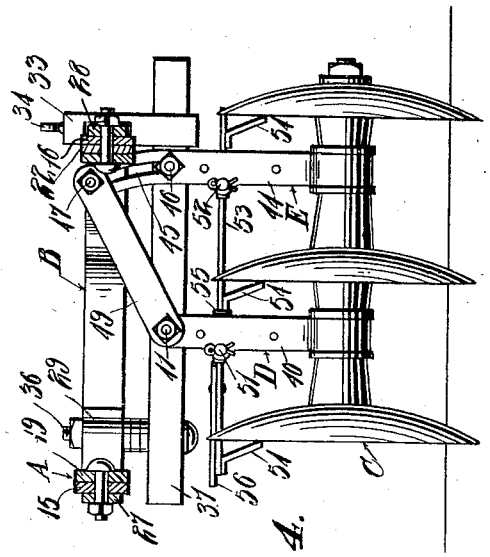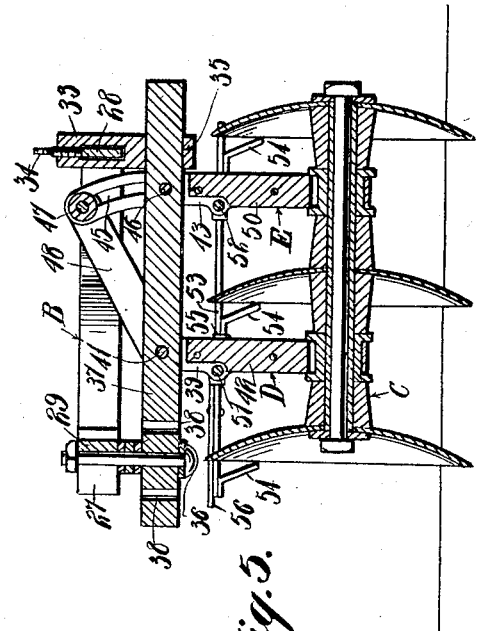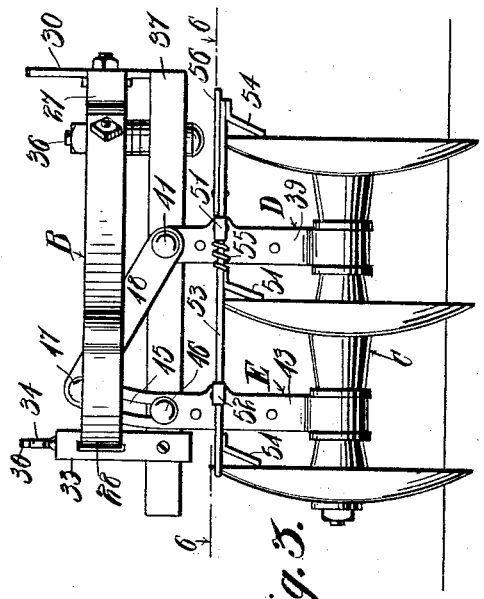

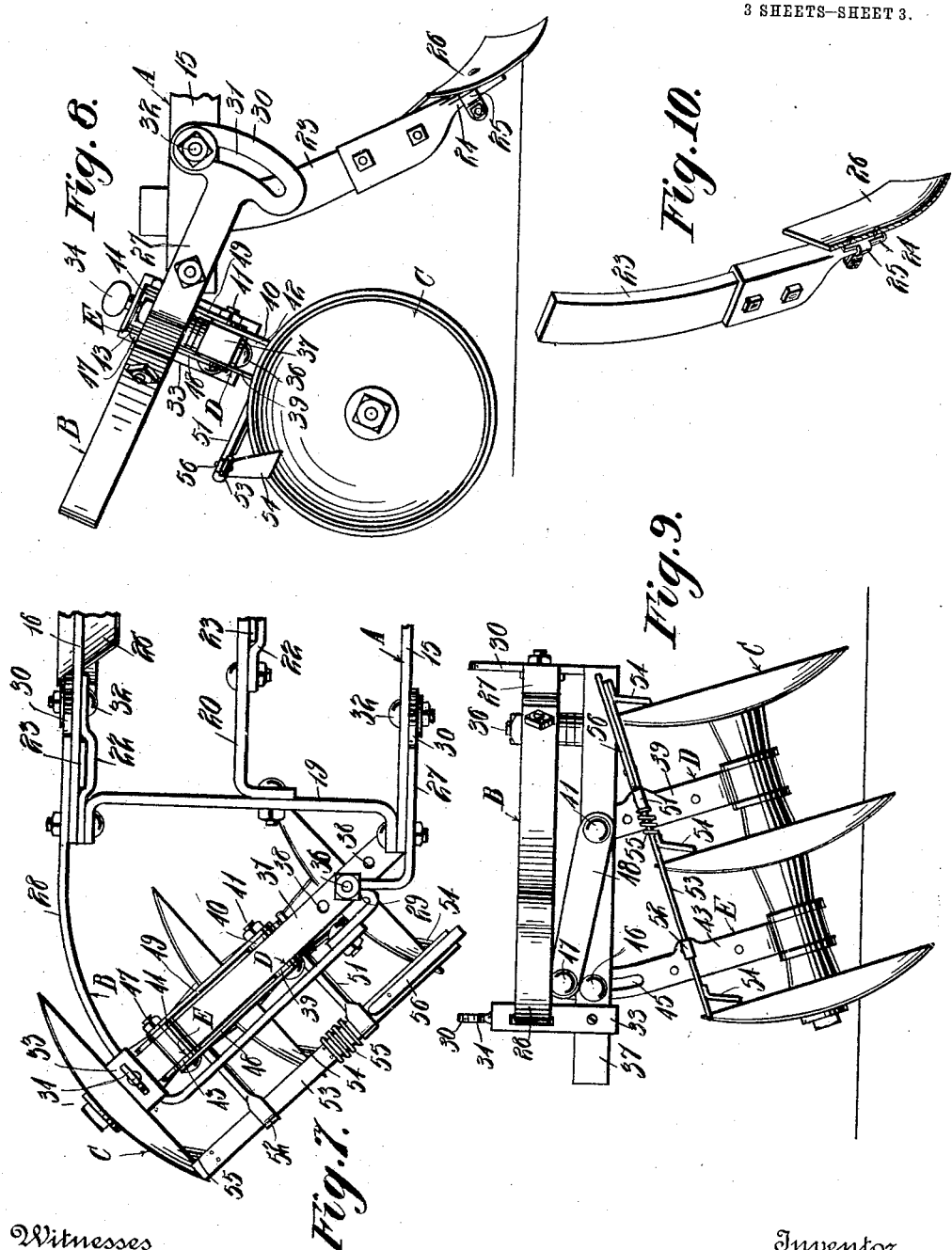

BYRON E. GREGG, OF CARLYLE, KANSAS.

CULTIVATOR.

1,111,378.  Specification of Letters Patent.  Patented Sept. 22, 1914.

Application filed April 30, 1913. Serial No. 764,677.

*To all whom it may concern:*

Be it known that I, BYRON E. GREGG, a citizen of the United States, residing at Carlyle, in the county of Allen, State of Kansas, have invented certain new and useful Improvements in Cultivators; and I do hereby declare the following to be a full, clear, and exact description of the invention, such as will enable others skilled in the art to which it appertains to make and use the same.

This invention relates to cultivators.

The object of the invention resides in the provision of a cultivator which embodies a plurality of shovels and a disk gang at the rear of the shovels operating to throw the soil loosened by the shovels around the plants.

A still further object of the invention resides in the provision of a cultivator in which the disk gang may be adjusted bodily in a vertical direction and also bodily in a horizontal direction and in addition adjusted at different angles to the longitudinal axis of the machine.

Another object of the invention resides in providing means whereby the disk gang may be adjusted so that one end thereof will be disposed at a greater elevation than the other end.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a plan view of a cultivator constructed in accordance with the invention; Fig. 2, a side view thereof; Fig. 3, a rear view of the cultivator; Fig. 4, a section on the line 4—4 of Fig. 1; Fig. 5, a section on the line 5—5 of Fig. 1; Fig. 6, a section on the line 6—6 of Fig. 3 showing the disk cleaning device released to active position; Fig. 7, a partial plan view with the disk gang adjusted to a different angle to the line of travel from what is shown in Fig. 1; Fig. 8, a partial side view showing the disk gang bodily adjusted upwardly from what is shown in Fig. 2; Fig. 9, a rear view showing the gang adjusted so as to dispose one end thereof at a greater elevation than the other end, and Fig. 10, a detail perspective view partly in section of one of the shovels.

Referring to the drawings the cultivator is shown as comprising a frame A which includes side members 15 and 16 the forward ends of which are contracted and connected by bolts 17, a block 18 being interposed between the forward end of said side members before the bolts 17 are applied. The side members 15 and 16 are connected at their rear ends by a cross member 19 and intermediate their ends by a cross member 20. These cross members 19 and 20 are in turn connected by a longitudinal beam 21. Secured to the side members 15 and 16 and the longitudinal beam 21 are clamping straps 22 which serve to hold the shovel standards 23 to the frame A. It will be noted that the strap 22 secured to the side member 15 is disposed relatively near the cross beam 20, while the strap 22 secured to the longitudinal beam 21 is at the rear of the strap secured to the side member 15, while the strap 22 secured to the side member 16 is at the rear of the strap 22 secured to the longitudinal beam 21. By this construction it will be apparent that by releasing one of the bolts of any of the straps 22 the standard 23 held thereby may be adjusted vertically as desired. The lower ends of the standards 23 terminate in a reduced stem 24 on which is engaged a clamping collar 25 carried by a shovel 26. By releasing the clamping collar 25 it will be apparent that the shovel 26 can be rotated on the stem 24 whereby the shovel may be positioned to throw the soil a greater or less distance from the plants to be cultivated.

Pivoted to the rear ends of the side members 15 and 16 are the free ends of the arms 27 and 28 of an approximately U-shaped supplemental frame B. The arm 27 of this frame B is looped to form a vertical bearing 29 and the arm 28 of this frame is curved so as to lie concentric to the bearing 29 for a purpose that will presently appear. The arms 27 and 28 are each extended beyond their pivotal connections with the side members 15 and 16 and terminate in enlarged portions 30 respectively provided with arcuate slots 31. Engaged through these slots 31 are bolts 32 carried respectively by side members 15 and 16. By loosening the bolts 32 it will be apparent that the rear end of the frame B may be raised and lowered and when disposed in the desired adjustment may be locked against movement by operating the bolts 32. Slidably mounted on the arm 28 of the frame B is a block 33 which carries a binding screw 34 adapted to be operated to impinge against the arm 28 to secure side block against sliding movement. The lower end of the block 33 is provided with a passage 35 for a purpose that will presently appear.

Mounted in the bearing 29 is a bolt 36 upon which is rotatably mounted one end of a beam 37 the other end of said beam being slidably engaged in the passage 35 of the block 33. The end of the beam 37 adjacent the bearing 29 is provided with a plurality of bolt openings 38 through which the bolt 36 is adapted to be interchangeably engaged. By thus interchangeably engaging the bolt 36 in the openings 38 the beam 37 can be adjusted transversely of the frame A. The disk gang of the cultivator is indicated generally at C and is supported from the beam 37 by means of U-shaped brackets D and E. The arms of the bracket D are indicated at 39 and 40 and the free ends of these arms are disposed in embracing relation to the beam 37 and pivotally connected to the latter by means of a bolt 41. A block 42 is interposed between the arms 39 and 40 between the beams 37 and the axles of the disk gang C. This block 42 serves to strengthen the bracket D. The arms of the brackets E are indicated at 43 and 44 respectively and are disposed in embracing relation to the beam 37. The free ends of the arms 43 and 44 are provided respectively with arcuate slots 45 through which is engaged a bolt 46, said bolt also passing through the beam 37. Engaged through the free end of the arms 43 and 44 above the beam 37 is a bolt 47 to which is pivotally connected the ends of links 48 and 49. The other ends of these links 48 and 49 are pivotally connected to the bolt 41. A block 50 is interposed between the arms 43 and 44 for the purpose of strengthening the bracket E. By this construction it will be apparent that upon loosening the bolt 46 the left hand end of the disk gang may be elevated and lowered and locked in a desired adjustment through the medium of the bolt 46. Carried by and projecting rearwardly from the brackets D and E are guide members 51 and 52 respectively in which is slidably mounted for movement transversely of the disk gang a cleaner carrying bar 53 upon which are fixed disk cleaners 54 corresponding in number to the number or disks in the gang C. These disk cleaners 54 are normally held in operative relation to respective disks of the gang by means of a spring 55 one end of which bears against the shank of one of the cleaners 54 and the other end against the guide member 52. Pivoted on the bar 53 is a cam 56 which when moved to a position longitudinally of the bar 53 will engage the guide member 52 and slide the bar 53 in said guide members against the influence of the spring 55 and thus draw the cleaners 54 away from respective disks of the gang. When the lever 56 is moved to lie at an angle to the bar 53 said bar is released to the influence of the spring 55 and moved by the latter so as to carry the cleaners 54 into coöperative relation with respective disks of the gang.

From the foregoing description taken in connection with the accompanying drawings it will be apparent that the disk gang C may be readily adjusted in various ways to meet varying conditions, such adjustment in response to changes in conditions serving to maintain the cultivator at a maximum efficiency with the result that a machine of the character described will be able to perform a maximum amount of work in a given time.

It will be apparent that the various adjustments referred to herein can be accomplished with little trouble and in a minimum space of time without any reorganization of parts whatsoever.

What I claim is:—

1. In a cultivator the combination of a frame, a block slidable on said frame and having a passage therethrough, a beam pivoted to the frame for movement in a horizontal plane and engaged through the passage in the block, a bracket pivoted to the beam, a second bracket having an adjustable sliding connection with the beam, and a disk gang supported by said brackets.

2. In a cultivator the combination of a main frame, a supplemental frame adjustably pivoted on the main frame for movement in a vertical plane a beam having one end pivotally supported upon the supplemental frame, and its other end slidably engaged with one side of the supplemental frame, said side of the supplemental frame being curved concentrically with respect to the pivot of the beam, means for locking the free end of the beam against sliding movement on the frame, and a disk gang supported from the beam.

In testimony whereof, I affix my signature, in the presence of two witnesses.

BYRON E. GREGG.

Witnesses:
  ELI SHARP,
  E. C. McCLAIN.